US012744727B2

(12) United States Patent
Dong et al.

(10) Patent No.: US 12,744,727 B2

(45) Date of Patent: Sep. 22, 2026

(54) GRANULARITY AWARE END-TO-END BANDWIDTH RESERVATION AND ROUTING PATH SELECTION

(71) Applicant: Huawei Technologies Co., Ltd., Shenzhen (CN)

(72) Inventors: Lijun Dong, Santa Clara, CA (US); Aihua Guo, Santa Clara, CA (US); Alexander Clemm, Santa Clara, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 324 days.

(21) Appl. No.: 18/507,697

(22) Filed: Nov. 13, 2023

(65) Prior Publication Data

US 2024/0080259 A1 Mar. 7, 2024

Related U.S. Application Data

(63) Continuation of application No. PCT/US2021/039447, filed on Jun. 28, 2021.

(51) Int. Cl.

*H04B 10/27* (2013.01)
*H04L 45/125* (2022.01)
*H04L 45/24* (2022.01)

(52) U.S. Cl.

CPC ............ *H04L 45/24* (2013.01); *H04B 10/27* (2013.01); *H04L 45/125* (2013.01)

(58) Field of Classification Search

None

See application file for complete search history.

(56) References Cited

U.S. PATENT DOCUMENTS

| | | | | |
|---|---|---|---|---|
| 7,254,748 | B1 | 8/2007 | Wright et al. | |
| 2016/0087883 | A1* | 3/2016 | Saad | H04L 45/50 370/238 |
| 2016/0112327 | A1* | 4/2016 | Morris | H04L 47/127 398/45 |
| 2018/0219618 | A1* | 8/2018 | Paraschis | H04B 10/07953 |
| 2018/0331941 | A1* | 11/2018 | Singh | H04L 47/726 |

FOREIGN PATENT DOCUMENTS

| | | | | |
|---|---|---|---|---|
| CN | 110971540 A | | 4/2020 | |
| EP | 2058986 B2 | * | 6/2014 | H04L 47/70 |

OTHER PUBLICATIONS

Hopps, C., "Analysis of an Equal-Cost Multi-Path Algorithm," Network Working Group, RFC 2992, Nov. 2000, 8 pages.

Thaler, D., et al., "Multipath Issues in Unicast and Multicast Next-Hop Selection," Network Working Group, RFC 2991, Nov. 2000, 9 pages.

* cited by examiner

*Primary Examiner* — Nathan M Cors

(74) *Attorney, Agent, or Firm* — Conley Rose, P.C.

(57) ABSTRACT

An Optical Transport Network (OTN) node, a Software Defined Network (SDN) controller, and a path selection method for selecting in the OTN node or SDN controller a path for an Internet traffic flow with an underlying OTN are provided. The method includes obtaining a plurality of paths for the traffic flow through the OTN; determining a wasted bandwidth for each path, based on an amount of requested bandwidth for the traffic flow; and selecting either no path or one path of the plurality of paths, the selection based on a value of a selection criterion determined for each path of the plurality of paths, the value of the selection criterion based on the wasted bandwidth for the path.

19 Claims, 5 Drawing Sheets

900

902
Send a bandwidth reservation request packet to a receiving node

GRANULARITY AWARE END-TO-END BANDWIDTH RESERVATION AND ROUTING PATH SELECTION

CROSS-REFERENCE TO RELATED APPLICATIONS

This application is a continuation of International Application No. PCT/US2021/039447 filed on Jun. 28, 2021, by Futurewei Technologies, Inc., and titled "Granularity Aware End-to-End Bandwidth Reservation and Routing Path Selection," which is incorporated herein in its entirety.

TECHNICAL FIELD

The present disclosure is generally related to Layer 3 routing path selection on top of Optical Transport Networks (OTN) and specifically to methods for granularity aware end-to-end bandwidth reservation and routing path selection.

BACKGROUND

OTNs typically have low granularity. For example, the minimum size of the service pipeline (referred to as ODU0) is 1.25 gigabits per second (Gbps), making it less suitable for carrying a high number of low-bandwidth services. Another consequence of low service granularity is poor resource utilization. For example, when ODU0 is used to carry a 100 megabits per second (Mbps) service, only 10% of the available bandwidth is utilized. Bandwidth adjustment processes in an OTN are slow and unwieldy, because services must be torn down and set up again for each bandwidth adjustment.

Traditionally, service provisioning over an OTN and its underlying Wavelength Division Multiplexing (WDM) optical networks is static and pre-planned. This is in contrast to dynamic routing provided at the Internet Protocol (IP) layer. Such static and pre-planned provisioning is due, in part, to the slow provisioning of OTN/WDM physical devices and to the physical nature of optical power calibration. Furthermore, OTN service capacity is a pre-planned investment by service providers. Finally, dynamic provisioning in the OTN Optical Service Unit (OSU) layer is slow compared with packet routing.

OSI Layer 3 (L3) networking VPN (L3VPN) may be used to create a private IP network over OTN. To provision an OTN tunnel between two OTN Provider Edge (PE) nodes, an OTN Software Defined Network (SDN) controller calculates a feasible OTN path and pushes the tunnel, thus defined, to the underlying OTN network. OTN client services are then created between access ports of the OTN source and destination PE nodes.

Such an OTN client service may be a transparent client service or an Ethernet client service. For a transparent client service, any port traffic coming into the access port of the OTN source PE node is wrapped as payload into one OSU Optical Data Unit (ODU) container without examining or processing its content. Examples of such transparent client services include Synchronous Optical Networking/Synchronous Digital Hierarchy (SONET/SDH), and Fibre Channel.

For an Ethernet client service, the OTN PE node may first push, pop, or modify Virtual Local Area Network (VLAN) tags such as a Customer VLAN (C-VLAN) tag (C-tag) or a Service VLAN (S-VLAN) tag (S-tag). The OTN PE node may then encapsulate each C-VLAN packet or S-VLAN packet into a separate ODU/OSU container. Alternatively, the OTN PE node may simply wrap the entire port traffic into one ODU/OSU container, as described for the transparent client service.

SUMMARY

A first aspect relates to a path selection method for selecting a path for an Internet traffic flow with an underlying Optical Transport Network (OTN) in a network element. The method includes obtaining by the network element a plurality of paths for the traffic flow through the OTN; determining by the network element a wasted bandwidth for each path, based on an amount of requested bandwidth for the traffic flow; and selecting by the network element either no path or one path of the plurality of paths, the selection based on a value of a selection criterion determined for each path of the plurality of paths, the value of the selection criterion based on the wasted bandwidth for the path.

Optionally, in any of the preceding aspects, another implementation of the aspect provides the value of the selection criterion for each path of the plurality of paths is determined based on a total wasted bandwidth for the path; and selecting the path comprises selecting the path having a minimum value of the selection criterion.

Optionally, in any of the preceding aspects, another implementation of the aspect provides the value of the selection criterion for each path of the plurality of paths is determined based on a wasted bandwidth of each hop of the path.

Optionally, in any of the preceding aspects, another implementation of the aspect provides the value of the selection criterion for each path of the plurality of paths is determined based on a minimum wasted bandwidth among all the hops of the path; and selecting the path comprises selecting the path having a maximum value of the selection criterion.

Optionally, in any of the preceding aspects, another implementation of the aspect provides the value of the selection criterion for each path of the plurality of paths is determined based on (i) a total wasted bandwidth for the path and (ii) a minimum wasted bandwidth among all the hops of the path; and selecting the path comprises selecting the path having a maximum value of the selection criterion.

Optionally, in any of the preceding aspects, another implementation of the aspect provides the value of the selection criterion for each path of the plurality of paths is determined based on a variance of the wasted bandwidth of the hops of the path; and selecting the path comprises selecting the path having a minimum value of the selection criterion.

Optionally, in any of the preceding aspects, another implementation of the aspect provides selecting the path having the minimum value of the selection criterion comprises randomly selecting by the network element one of a subset of paths where each path of the subset of paths has a value of the selection criterion equal to the minimum value of the selection criterion.

Optionally, in any of the preceding aspects, another implementation of the aspect provides selecting the path having the maximum value of the selection criterion comprises randomly selecting by the network element one of a subset of paths where each path of the subset of paths has a value of the selection criterion equal to the maximum value of the selection criterion.

Optionally, in any of the preceding aspects, another implementation of the aspect provides the network element selects one path of the plurality of paths.

A second aspect relates to a method for routing path selection and bandwidth reservation in a node with an Optical Transport Network (OTN) as an underlying network. The method includes receiving by the node a plurality of bandwidth reservation request packets originating from a sending node of the OTN over a corresponding plurality of paths, each bandwidth reservation request packet comprising information relating to a selection criterion and an amount of requested bandwidth for an Internet traffic flow with the OTN; selecting by the node either no path or one path of the plurality of paths by performing the path selection method of any of the preceding aspects; and sending by the node a plurality of bandwidth reservation response packets to the sending node, each bandwidth reservation response packet sent over a different path of the plurality of paths, each bandwidth reservation response packet of the plurality of bandwidth reservation response packets comprising information indicating whether the path over which it is sent was selected, and a bandwidth reservation response packet sent over a selected path configured to cause nodes on the selected path to reserve bandwidth for the traffic flow.

Optionally, in any of the preceding aspects, another implementation of the aspect provides at least one bandwidth reservation request packet of the plurality of bandwidth reservation request packets includes information relating to the wasted bandwidth for the path over which it is sent.

Optionally, in any of the preceding aspects, another implementation of the aspect provides at least one bandwidth reservation request packet of the plurality of bandwidth reservation request packets includes information relating to the wasted bandwidth on each hop of the path over which it is sent.

Optionally, in any of the preceding aspects, another implementation of the aspect provides the network element selects one path of the plurality of paths.

A third aspect relates to a method for routing path selection and bandwidth reservation in a node with an Optical Transport Network (OTN) as an underlying network. The method includes receiving by the node a bandwidth reservation request packet comprising information relating to an amount of requested bandwidth for an Internet traffic flow through the OTN; in response to receiving the bandwidth reservation request packet, inserting by the node into the bandwidth reservation request packet an indication of a wasted bandwidth at the node if the requested bandwidth is reserved; and transmitting the bandwidth reservation request packet to a subsequent node.

Optionally, in any of the preceding aspects, another implementation of the aspect provides further comprising: in response to receiving the bandwidth reservation request packet, reserving by the node the amount of requested bandwidth as subject to a bandwidth reservation request; and receiving by the node a bandwidth reservation response packet comprising information indicating whether the node is to un-reserve the amount of requested bandwidth reserved as subject to a bandwidth reservation request.

Optionally, in any of the preceding aspects, another implementation of the aspect provides the information indicating whether the node is to un-reserve the amount of requested bandwidth comprises information indicating whether the node is on a selected path for Internet traffic flow through the OTN.

Optionally, in any of the preceding aspects, another implementation of the aspect provides receiving by the node a bandwidth reservation request packet where the node is in a plurality of paths for Internet traffic flow through the OTN; and sending by the node the bandwidth reservation request packet to a receiving node over fewer than all the paths of the plurality of paths.

Optionally, in any of the preceding aspects, another implementation of the aspect provides the bandwidth reservation request packet is not sent over a first path of the plurality of paths where the node determines that wasted bandwidth in a subsequent hop of the first path will cause a selection criterion not to select the first path.

Optionally, in any of the preceding aspects, another implementation of the aspect provides storing by the node information relating to a previously selected path, the stored information including an amount of requested bandwidth, a selection criterion, and a receiving node of the previously selected path; and sending by the node the bandwidth reservation request packet to the receiving node over only the previously selected path when the amount of requested bandwidth, the selection criterion, and the receiving node of the bandwidth reservation request packet match the amount of requested bandwidth, the selection criterion, and the receiving node of the previously selected path.

A fourth aspect relates to a method for routing path selection and bandwidth reservation in a sending node with an Optical Transport Network (OTN) as an underlying network. The method includes sending by the sending node a bandwidth reservation request packet to a receiving node, the bandwidth reservation request packet comprising information relating to an amount of requested bandwidth for an Internet traffic flow with the OTN configured to: cause intermediate nodes along a path from the sending node to the receiving node to insert into the bandwidth reservation request packet an indication of an amount of wasted bandwidth at the intermediate node if the requested bandwidth is reserved; and cause the receiving node to perform the methods of any of the methods of the first and second aspects.

Optionally, in any of the preceding aspects, another implementation of the aspect provides the bandwidth reservation request packet, wherein the bandwidth reservation request packet is configured to cause the intermediate nodes to reserve the amount of requested bandwidth as subject to a bandwidth reservation request.

Optionally, in any of the preceding aspects, another implementation of the aspect provides the bandwidth reservation request packet, wherein the bandwidth reservation request packet is configured to cause an intermediate node that is in a plurality of paths for Internet traffic flow through the OTN to send the bandwidth reservation request packet to the receiving node over fewer than all the paths of the plurality of paths.

Optionally, in any of the preceding aspects, another implementation of the aspect provides the bandwidth reservation request packet, wherein the bandwidth reservation request packet is configured to cause the intermediate node that is in a plurality of paths for Internet traffic flow through the OTN not to send the bandwidth reservation request packet over a first path of the plurality of paths where the intermediate node determines that wasted bandwidth in a subsequent hop of the first path will cause a selection criterion not to select the first path.

Optionally, in any of the preceding aspects, another implementation of the aspect provides the bandwidth reservation request packet, wherein the bandwidth reservation request packet further comprises information relating to a selection criterion and is configured to cause an intermediate node to send the bandwidth reservation request packet over only a previously selected path stored by the intermediate node when the amount of requested bandwidth, the selection criterion, and the receiving node of the bandwidth reservation request packet match an amount of requested bandwidth, a selection criterion, and a receiving node of the previously selected path.

A fifth aspect relates to an Optical Transport Network (OTN) node, comprising: a memory configured to store instructions; and a processor coupled to the memory and configured to execute the instructions to perform any of the methods of the fourth aspect.

A sixth aspect relates to an Optical Transport Network (OTN) node, comprising: a memory configured to store instructions; and a processor coupled to the memory and configured to execute the instructions to perform any of the methods of the second aspect.

A seventh aspect relates to an Optical Transport Network (OTN) node, comprising: a memory configured to store instructions; and a processor coupled to the memory and configured to execute the instructions to perform any of the methods of the third aspect.

An eighth aspect relates to an Optical Transport Network (OTN) node, comprising: a memory configured to store instructions; and a processor coupled to the memory and configured to execute the instructions to perform any of the methods of the second and third aspects.

A ninth aspect relates to an Optical Transport Network (OTN) node, comprising: a memory configured to store instructions; and a processor coupled to the memory and configured to execute the instructions to perform any of the methods of the second aspect and any of the methods of the second, third, and fourth aspects.

A tenth aspect relates to a method for routing path selection and bandwidth reservation in a Software Defined Network (SDN) controller. The method includes receiving, by the SDN controller, a bandwidth reservation request sent by a sending node with an Optical Transport Network (OTN) as an underlying network, the bandwidth reservation request comprising information relating to a requested bandwidth for an Internet traffic flow with the OTN, and an identity of a receiving node with the OTN as the underlying network; selecting, by the SDN controller, either no path or one path of a plurality of paths in the OTN for the Internet traffic flow by performing the path selection methods of the first aspect; sending by the SDN controller bandwidth allocation commands to nodes of the selected path, if any, the bandwidth allocation commands configured to cause the nodes to reserve the requested bandwidth for the traffic flow; and sending by the SDN controller a bandwidth reservation response to the sending node, the bandwidth reservation response comprising information identifying the selected path, if any.

Optionally, in any of the preceding aspects, another implementation of the aspect provides the bandwidth reservation request further includes information relating to the selection criterion.

Optionally, in any of the preceding aspects, another implementation of the aspect provides the bandwidth reservation response, wherein the bandwidth reservation response is configured to cause the sending node to include information identifying the selected path, if any, in packets of the Internet traffic flow.

An eleventh aspect relates to a Software Defined Network (SDN) controller, comprising: a memory configured to store instructions; and a processor coupled to the memory and configured to execute the instructions to perform any of the methods of the tenth aspect.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

There are cases when OTN bandwidth may be wasted by network slicing. In some cases the policy of network slicing may disallow two IP transport slices from sharing the same OTN time slots. In those cases, slices will be encapsulated into different ODU slots, which may result in wasted bandwidth.

In some cases there are routing constraints: In a first case, two IP traffic flows must be routed over disjoint Shared Risk Link Group (SRLG) OTN paths. In a second case two IP traffic flows have different protection requirements and are routed using different OTN paths with different protection capabilities. Either case may result in wasted bandwidth for one or both OTN paths. Still other routing constraints disallow aggregation on the OTN client access port.

Layer 3 routers are not currently made aware of such wasted OTN bandwidth which may result when there are multiple paths available in the selection of a path with a wasted bandwidth that is less desirable, based on some criterion of wasted bandwidth. Equal-Cost Multi-Path (ECMP) and Border Gateway Protocol (BGP) are routing strategies that may identify multiple alternative paths. The granularity aware end-to-end bandwidth reservation and routing path selection of the present disclosure operates in conjunction with ECMP, BGR, and other such routing strategies to select among multiple paths identified by the routing strategy, where the selection is based on a measure of the wasted OTN bandwidth of each identified path.

The granularity aware end-to-end bandwidth reservation and routing path selection of the present disclosure provides a method to inform applications and L3 routers about the path having a best granularity for bandwidth allocation, based on a specified criterion, in order to support L3 bandwidth reservation and routing. The methods of the present disclosure collect the difference between a requested bandwidth and the actually reserved bandwidth (defining a wasted bandwidth) resulting from the minimum bandwidth sizes of a service pipeline in an underlying OTN. The methods then select a routing path based on a wasted bandwidth.

Figure 1:
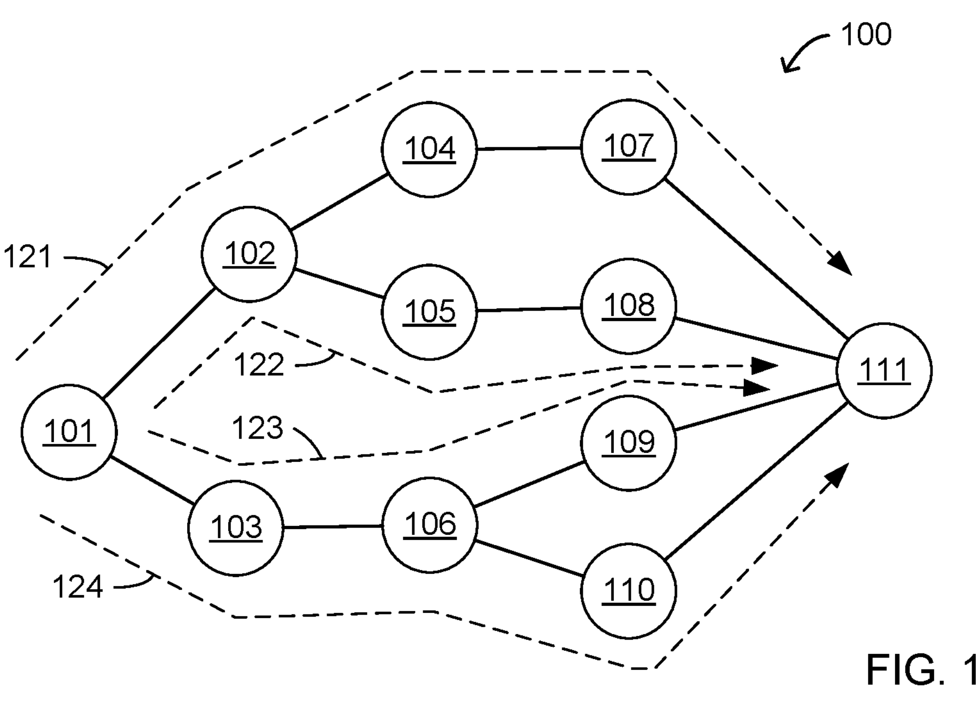
FIG. 1 is a diagram of a first router topology according to an embodiment of the present disclosure.

FIG. 1 is a diagram of a first router topology 100 according to an embodiment of the present disclosure. There may be an underlying OTN network between pairs of nodes in the router topology. The router topology 100 includes eleven nodes (identified by reference characters 101 through 111), interconnected as shown in FIG. 1. Four paths from node 101 to node 111 (identified by reference characters 121-124) have been indicated. Using a path selection method according to the present disclosure (described in more detail with reference to FIG. 3), a preferred path amongst the paths 121-124 may be chosen.

In a first embodiment according to the present disclosure, a method (described in more detail with reference to FIG. 4) uses data plane messages for bandwidth reservation and routing path selection. The node 101 is a sending node that sends a bandwidth reservation request packet to the node 111, referred to as a receiving node. The nodes 102 through 110 may be referred to as intermediate nodes. In some embodiments, the sending node 101 sends the bandwidth reservation request packet to all possible next-hop nodes associated with the receiving node 111 (in router topology 100, nodes 102 and 103). The nodes 102 and 103 then forward the packet to all possible next-hop nodes associated with the receiving node 111, and so forth for each node that receives the packet, until the bandwidth reservation request packet reaches the receiving node 111. Additionally, each node adds to the packet (such as to a header of the packet) information specifying the path that the packet has followed through the router topology 100. All nodes may add to the information the node from which they received the packet or the node to which they sent the packet. Such a path may be referred to as a 'discovered' path.

In other such embodiments, the sending node 101 receives a 'predefined' plurality of paths 121-124 from an ECMP, BGP, or other suitable routing strategy that identifies multiple paths. In such embodiments, the sending node 101 includes information in a header of the bandwidth reservation request packet, the information identifying the sequence of the nodes in the desired path and configured to cause each node in the path to forward the bandwidth reservation request packet to the specified next node in the path.

In either the 'discovered' paths or 'predefined' paths embodiment described above (or combinations thereof), the bandwidth reservation packet comprises requested bandwidth (i.e., information relating to an amount of OTN bandwidth to be reserved for the traffic flow on the selected path). In response to receiving the bandwidth reservation request packet, each node reserves the amount of requested bandwidth as subject to a bandwidth reservation request, in order to prevent the node from allocating that portion of bandwidth in response to another bandwidth reservation request packet. In some embodiments, each node calculates the wasted bandwidth in its link to the succeeding node in the path, based on the requested bandwidth. The wasted bandwidth is then inserted into the bandwidth reservation request packet by the node. In other embodiments, the node can insert sufficient information into the packet for a subsequent node to determine the wasted bandwidth at the current node. For example, a granularity of reservable bandwidth can be used with the requested bandwidth to calculate the wasted bandwidth. More generally, an indication of the wasted bandwidth at the node can be inserted.

Furthermore, in some such embodiments, each node inserts into the bandwidth reservation request packet information indicating whether or not the node is able to provide the requested bandwidth at all. If the node is able to provide the bandwidth, then information relating to the wasted bandwidth is inserted into the packet, as described above. If the node is not able to provide the bandwidth, then the node inserts a 'not admissible' flag into the packet. The presence of the 'not admissible' flag indicates that the entire path is unusable for the requested bandwidth and can cause subsequent nodes to pass the bandwidth reservation request packet without calculating and inserting their amounts of wasted bandwidth into the packet.

In some embodiments, a first technique is used to reduce the number of bandwidth reservation request packets sent through the network (reduce a bandwidth reservation request explosion), thereby reducing the effect of data plane bandwidth reservation on network traffic volume. When a node is part of a subset of the plurality of paths 121-124, where the subset of paths includes two or more paths, such a node may be referred to as a "common node." For example, nodes 102 and 106 in the router topology 100 of FIG. 1 are common nodes. In such embodiments, the common node can also have information relating to wasted bandwidth in subsequent hops of the subset of paths and the bandwidth reservation request packet includes information relating to a selection criterion for the path selection method. The common node may determine that the wasted bandwidth in a subsequent hop of a first path of the subset of paths is likely to cause the selection criterion not to select the first path, when compared against the other paths of the subset of paths. In response, the common node does not forward the bandwidth reservation request packet, instead forwarding the bandwidth reservation request packet over only the other paths of the subset of paths. That is, the common node sends the bandwidth reservation request packet over fewer than all the paths of the subset of paths, thus reducing the number of bandwidth reservation request packets sent through the network.

The receiving node 111 receives a plurality of bandwidth reservation request packets corresponding to the plurality of paths. In response, the receiving node 111 performs the path selection method, selects one of the paths 121-124 as a selected path (or determines that no path is acceptable—for example, if no path can provide the requested bandwidth), and sends to the sending node 101 over each of the paths 121-124 a plurality of bandwidth reservation response packets corresponding to the plurality of paths 121-124. The bandwidth reservation response packet comprises information relating to the results of the path selection method, as described in more detail with reference to FIG. 3. The bandwidth reservation response packet is configured to cause each node that is not on the selected path to un-reserve (or release) the amount of bandwidth it had reserved when it received the corresponding bandwidth reservation request packet.

In some embodiments, a second technique is used to reduce the number of bandwidth reservation request packets sent through the network, thereby reducing the effect of data plane bandwidth reservation on network traffic volume. As the bandwidth reservation response packet is received at each node of a path that was selected (including the sending node 101), the node caches information relating to the path that was selected, the requested bandwidth amount, the selection criterion, and the identity of the receiving node 111. If a later bandwidth reservation request packet is received at any intermediate node and the bandwidth reservation request packet specifies the same requested bandwidth amount, selection criterion, and receiving (or destination) node as was cached for a previously selected path, a determined segment of path that was cached, the intermediate node sends the bandwidth reservation request packet to the receiving node over only the previously selected path, thus reducing the number of bandwidth reservation request packets sent through the network.

Figure 2:
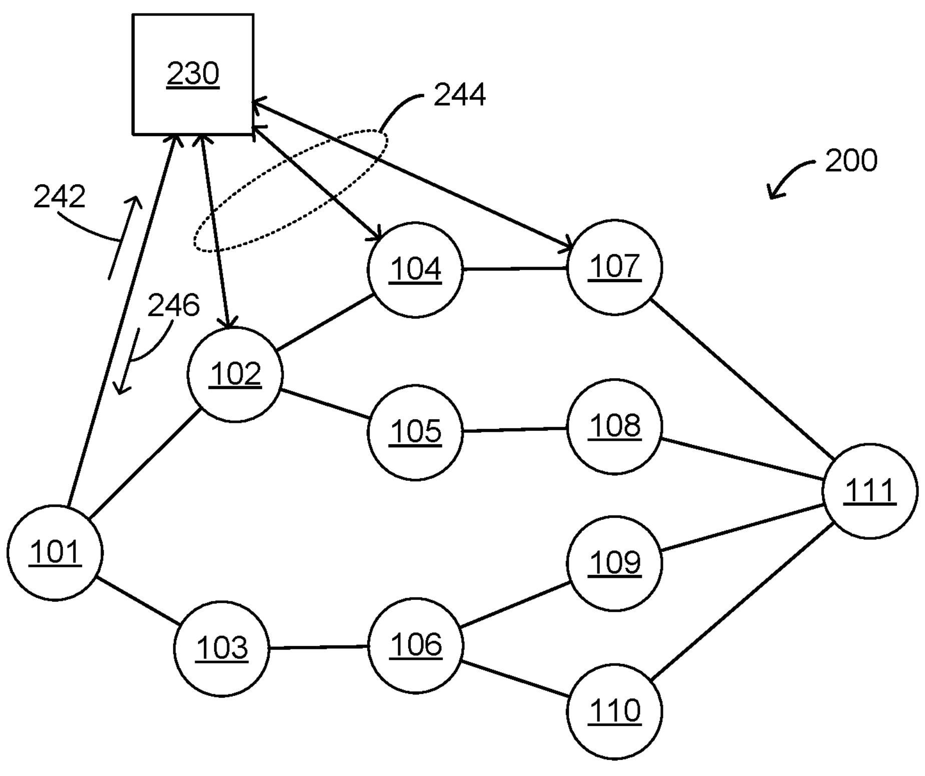
FIG. 2 is a diagram of a second router topology according to an embodiment of the present disclosure.

FIG. 2 is a diagram of a second router topology 200 according to an embodiment of the present disclosure. The router topology 200 comprises the same 11 nodes (101-111) having the same interconnections as the router topology 100 of FIG. 1. The router topology 200 further includes a SDN controller 230 having communication links to nodes 101-111 (only the links to nodes 101, 102, 104, and 107 are shown in FIG. 2). The same paths 121-124 from node 101 to node 111 have been identified by a routing strategy but, for clarity, are not shown in FIG. 2.

In a second embodiment of the present disclosure, a method (described in more detail with reference to FIG. 5) uses control plane messages for bandwidth reservation and routing path selection. The sending node 101 sends a bandwidth reservation request 242 to the SDN controller 230. In some embodiments, the bandwidth reservation request 242 includes a selection criterion (as described in more detail with reference to FIG. 3). In response to receiving the bandwidth reservation request, the SDN controller 230 performs the path selection method and selects one of the paths 121-124 as a selected path (or determines that no path is suitable). If, for example, path 121 is selected, the SDN controller 230 sends bandwidth allocation commands 244 to intermediate nodes 102, 104, and 107. The bandwidth allocation command that is sent to a node includes information relating to an amount of bandwidth to be reserved by the node in its link to a succeeding node in the path (nodes 104, 107, and 111, respectively, in the router topology 200). The SDN controller 230 also sends a bandwidth reservation response 246 to the sending node 101, including information identifying the nodes of the selected path (or information indicating that no path was selected). In some embodiments, the bandwidth reservation response 246 further includes information relating to the selection criterion used in selecting the selected path, and/or information relating to the plurality of paths 121-124. The messages 242, 244, and 246 are sent via one or more networks that communicatively couple at least the nodes 101, 102, 104, and 107 with the SDN controller 230.

In some embodiments, the sending node 101 includes in packets of the traffic flow, information that identifies the nodes of the selected path. In some such embodiments, such information may be included in headers of the traffic flow packets.

Figures 3, 4:
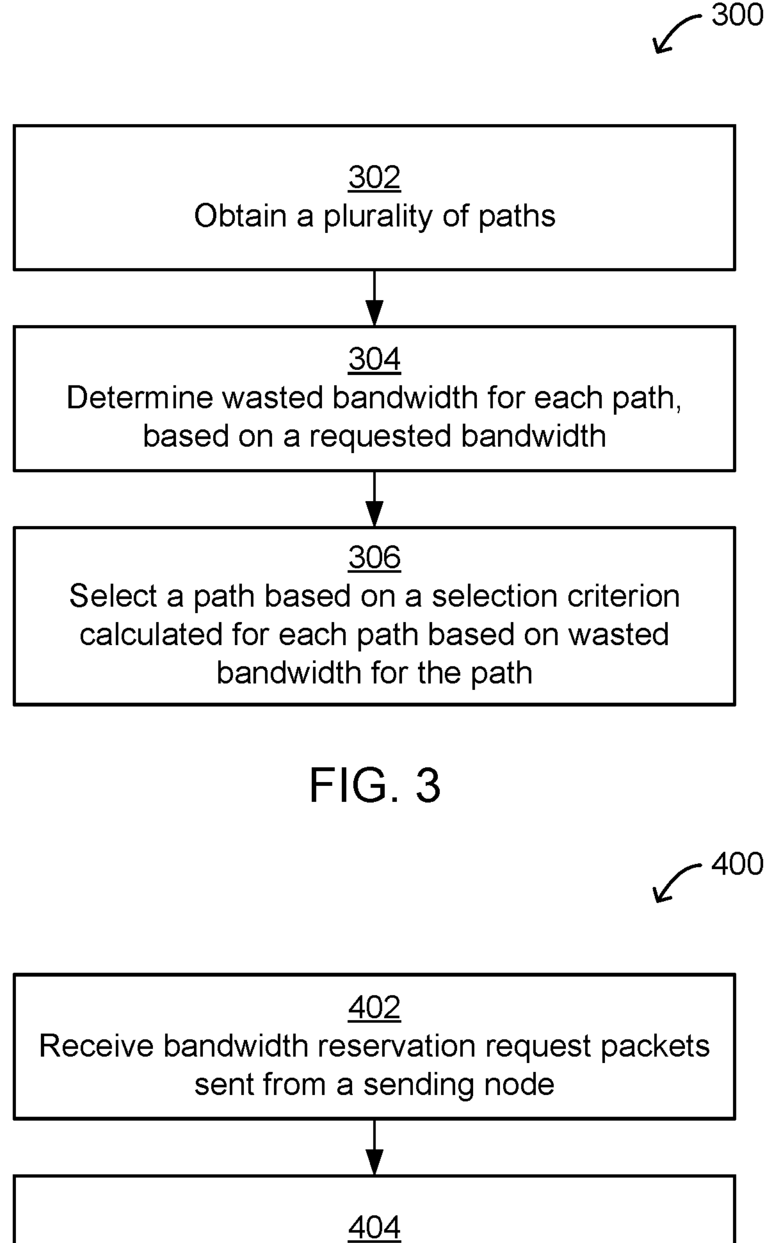
FIG. 3 illustrates a path selection method according to an embodiment of the present disclosure.
FIG. 4 illustrates a method according to an embodiment of the present disclosure for routing path selection and bandwidth reservation using data plane messages.

FIG. 3 illustrates a path selection method 300 according to an embodiment of the present disclosure. In step 302, a network element performing the path selection method obtains a plurality of paths for a traffic flow through a router topology. In step 304, the network element determines a wasted bandwidth for each path, based on a requested bandwidth for the traffic flow. In step 306, the network element selects one path of the plurality of paths, where the selection is based on a selection criterion that is calculated for each path and a value of the selection criterion for each path is based on the wasted bandwidth for the path. In some cases, no path of the plurality of paths will have an acceptable selection criterion value and no path will be selected in step 306.

In some embodiments, in step 302 the network element receives the plurality of paths from another network element. In other embodiments, in step 302 the network element calculates the plurality of paths or requests such calculation by another computing device. In either of these embodiments, the plurality of paths may be calculated by ECMP, BGP, or other such multiple path routing strategy. In still other embodiments, in step 302 the network element collates the plurality of paths from the paths by which bandwidth reservation request packets were received, and the path selection method 300 is performed in response to the receipt of the bandwidth reservation request packets.

In step 304, the network element obtains information relating to a granularity for OTN bandwidth reservation in each hop of each path of the plurality of paths. In some embodiments, such granularity information may be obtained by interactions via a Northbound Interface (NBI) with an SDN controller of the OTN or via control plane protocols. The information can be the granularity at each hop (which can be used with the requested bandwidth to determine the wasted bandwidth), or an amount of wasted bandwidth at each hop (determined using the granularity at each hop and the requested bandwidth). Similarly, subsets of this information might also be obtained, such as a minimum or maximum amount of wasted bandwidth over all hops on each path. As further described below, different information is necessary for different selection criteria.

For purposes of describing four example selection criteria, an example request for reservation of 57 megabytes (MB) of bandwidth on each link is described. Table 1 shows the example granularity for bandwidth assignment on each link ("Gran."), the actual bandwidth reservation required to provide at least the requested 57 MB of bandwidth on the link ("Res."), and the wasted bandwidth (above 57 MB) on the link ("Waste"). For example, in Link 101 to 102, the granularity is 25 MB. Thus, to accommodate a 57 MB reservation, three units must be reserved, yielding 75 MB of actual bandwidth reservation. This results in 75−57=18 MB of wasted bandwidth.

TABLE 1

| Link | Gran. (MB) | Res. (MB) | Waste (MB) |
|---|---|---|---|
| 101 to 102 | 25 | 75 | 18 |
| 101 to 103 | 18 | 72 | 15 |
| 102 to 104 | 2 | 58 | 1 |
| 102 to 105 | 10 | 60 | 3 |
| 103 to 106 | 18 | 72 | 15 |
| 104 to 107 | 8 | 64 | 7 |
| 105 to 108 | 8 | 64 | 7 |
| 106 to 109 | 18 | 64 | 7 |
| 106 to 110 | 50 | 100 | 43 |
| 107 to 111 | 2 | 58 | 1 |
| 108 to 111 | 10 | 60 | 3 |
| 109 to 111 | 18 | 72 | 15 |
| 110 to 111 | 18 | 72 | 15 |

In step 306, the network element calculates a value for a selection criterion for each path of the plurality of paths, based on the wasted bandwidths of the links (or hops) in the path. The network element then selects a path based on the selection criteria values calculated for the paths in the plurality of paths. The selection criterion to be used may be specified in a request for reservation of bandwidth for a traffic flow, it may be specified by an OTN system administrator, or it may be specified in some other way.

Table 2 shows the wasted bandwidth in each hop of each of the paths 121-124:

TABLE 2

| Path | Wasted Bandwidth per Hop |
|---|---|
| 121 | 18, 1, 7, 1 |
| 122 | 18, 3, 7, 3 |
| 123 | 15, 15, 15, 15 |
| 124 | 15, 15, 43, 15 |

The following are examples of selection criteria that may be used in step 306 of various embodiments of the present disclosure.

Example Selection Criterion 1

Select the path having a minimum total wasted bandwidth for the path over all hops, defined as $$\text{Min}\left\{\sum_{h=1}^{H} wastedBW_h\right\},$$

where h is a hop number of a link in the path, His the total number of hops in the path, and wasted $BW_h$ is the wasted bandwidth in the hop h.

The use of Selection Criterion 1 may be beneficial to the network to improve OTN service pipeline efficiency, although other equations can also be used to improve pipeline efficiency and reduce wasted bandwidth. Table 3 shows that, using Selection Criterion 1, the path 121 would be selected.

TABLE 3

| Path | Total Wasted Bandwidth |
|---|---|
| 121 | 27 |
| 122 | 31 |
| 123 | 60 |
| 124 | 103 |

Example Selection Criterion 2

Select the path having a largest value of a minimum wasted bandwidth among all hops of the path, defined as $$\text{Max}\{\min\{\text{wasted}BW_1, \ldots, \text{wasted}BW_H\}\},$$

where wasted $BW_1$ is the wasted bandwidth in the first hop in the path, wasted $BW_2$ is the wasted bandwidth in the second hop in the path, etc.

The use of Selection Criterion 2 allows the sending node 101 to use the path providing the maximum capacity for bandwidth surges above the requested bandwidth. Other selection criteria can also be used to increase capacity for bandwidth surges, such as that in Criterion 3 (below). Table 4 shows that, using Selection Criterion 2, either path 123 or 124 could be selected. Regardless of the selection criterion used in a path selection method according to an embodiment of the disclosure, random selection, selecting for minimum cost, or other technique may be used to select among equally desirable paths.

TABLE 4

| Path | Minimum Wasted Bandwidth |
|---|---|
| 121 | 1 |
| 122 | 3 |
| 123 | 15 |
| 124 | 15 |

Example Selection Criterion 3

Select the path having a largest value of a minimum wasted bandwidth among all hops of the path plus a total wasted bandwidth for the path, defined as $$\text{Max}\left\{\min\{wastedBW_1, \ldots, wastedBW_H\} + \sum_{h=1}^{H} wastedBW_h\right\},$$

where wasted $BW_1$ is the wasted bandwidth in the first hop in the path, wasted $BW_2$ is the wasted bandwidth in the second hop in the path, etc., h is a hop number of a link in the path, H is the total number of hops in the path, and wasted $BW_h$ is the wasted bandwidth in the hop h.

The use of Selection Criterion 3 allows the sending node 101 to use the path providing (i) the maximum capacity for bandwidth surge above the requested bandwidth, as well as (ii) maximum local rate surge at each node on the path. Table 5 shows that, using Selection Criterion 3, path 124 would be selected.

Criterion 3 illustrates one way to combine measures of wasted bandwidth to balance two or more goals when selecting a path. In other embodiments, a two stage selection criterion could be used, in which, if two paths tie on a first measure, then a second measure is used to break the tie. In still other embodiments, a path is selected based on a sum of two weighted measures of wasted bandwidth.

TABLE 5

| Path | Combination of Minimum Hop Bandwidth plus Total Wasted Bandwidth |
|---|---|
| 121 | 28 |
| 122 | 34 |
| 123 | 75 |
| 124 | 118 |

Example Selection Criterion 4

Select the path having a minimum variance among wasted bandwidth of all hops of the path, defined as $$\text{Min}\{\text{variance}\{\text{wasted}BW_1, \ldots, \text{wasted}BW_H\}\},$$

where wasted $BW_1$ is the wasted bandwidth in the first hop in the path, wasted $BW_2$ is the wasted bandwidth in the second hop in the path, etc.

The use of Selection Criterion 4 results in selection of a path having a similar wasted bandwidth in each hop of the path. Other criteria can also be used to choose a path with similar amounts of wasted bandwidth in each hop. Table 6 shows that, using Selection Criterion 4, path 123 would be selected.

TABLE 6

| Path | Variance of Wasted Bandwidth |
|---|---|
| 121 | 48.2 |
| 122 | 37.7 |
| 123 | 0 |
| 124 | 147 |

FIG. 4 illustrates a method 400 according to an embodiment of the present disclosure for routing path selection and bandwidth reservation using data plane messages. Referring to the nodes 101-111 and paths 121-124 of FIG. 1, in step 402, the receiving node 111 receives a plurality of bandwidth reservation request packets corresponding to the plurality of paths 121-124.

In response to receiving the plurality of bandwidth reservation request packets, in step 404 the receiving node 111 performs the path selection method 300 described with reference to FIG. 3. The receiving node 111 performs the path selection method 300 based on the amount of requested bandwidth, the resulting wasted bandwidth in at least one link (or hop) of each path (and optionally all links of each path), and the selection criterion, as specified in the bandwidth reservation request packets (or received by the receiving node 111 via its NBI from an SDN controller or other network device).

In step 406, the receiving node 111 creates a plurality of bandwidth reservation response packets corresponding to the plurality of paths 121-124. Each of the bandwidth reservation response packets is sent to the sending node 101 on a different one of the paths 121-124. Each bandwidth reservation response packet comprises information relating to the path to be taken to forward the bandwidth reservation response packet to the sending node 101, an indication of whether or not the bandwidth reservation request was successful, and an indication of whether or not the path on which the bandwidth reservation response packet is being sent is the selected path.

The inclusion in every bandwidth reservation response packet of the indication of whether or not the bandwidth reservation request was successful allows the sending node 101 to determine from the first received bandwidth reservation response packet that the request was unsuccessful without having to wait for the receipt of all the bandwidth reservation response packets. The inclusion in the bandwidth reservation response packet of the indication of whether or not the path on which the bandwidth reservation response packet is being sent is the selected path configures the bandwidth reservation response packet to cause nodes not on the selected path to un-reserve (or release) the amount of bandwidth it had reserved when it received the corresponding bandwidth reservation request packet. Such inclusion also configures the bandwidth reservation response packet to cause nodes on the selected path to reserve bandwidth for the traffic flow.

Figure 5:
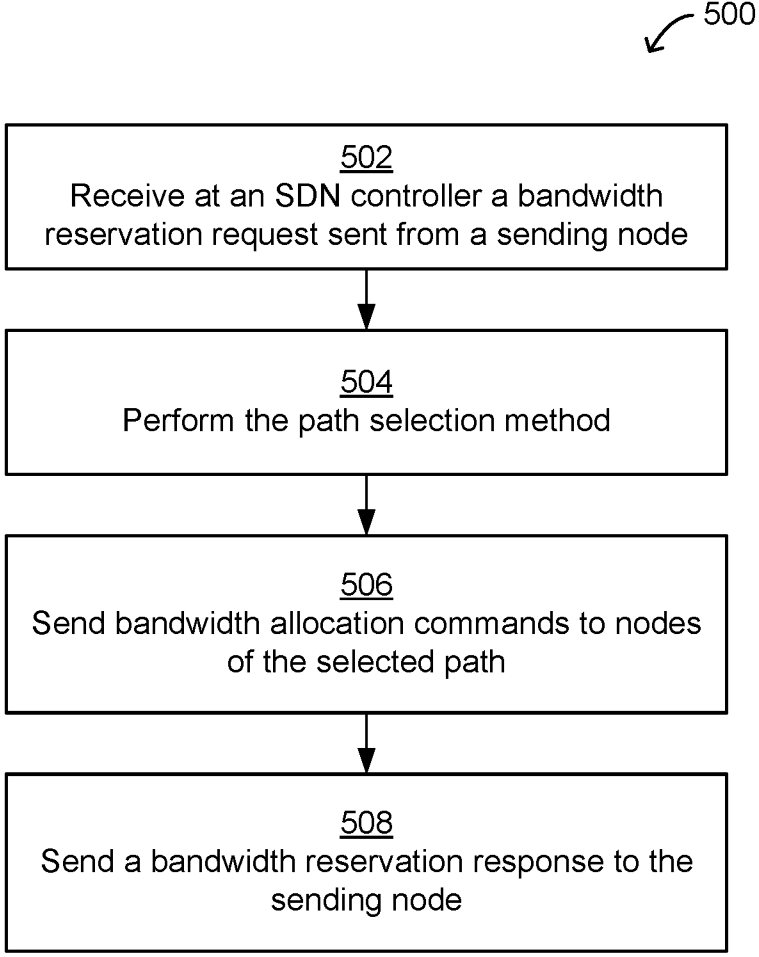
FIG. 5 illustrates a method according to an embodiment of the present disclosure for routing path selection and bandwidth reservation using control plane messages.

FIG. 5 illustrates a method 500 according to an embodiment of the present disclosure for routing path selection and bandwidth reservation using control plane messages. Referring to the nodes 101-111 of FIGS. 1 and 2, the paths 121-124 of FIG. 1, and the SDN controller 230 of FIG. 2, in step 502 the SDN controller 230 receives a bandwidth reservation request 242 from the sending node 101. The bandwidth reservation request 242 comprises information relating to the requested bandwidth and an identity of the receiving node 111.

In response to receiving the bandwidth reservation request 242, in step 504 the SDN controller 230 performs the path selection method 300 described with reference to FIG. 3. The SDN controller 230 performs the path selection method 300 based on the amount of requested bandwidth, the resulting wasted bandwidth in each link (or hop) of each path, and the selection criterion. At least the amount of requested bandwidth and the identity of the receiving node 111 are specified in the bandwidth reservation request 242. In many embodiments, node availability, link bandwidth granularity, network topology, and routing paths 121-124 are stored in the SDN controller 230 or obtained from another network device. The selection criterion may be specified in the bandwidth reservation request 242 or may be stored in the SDN controller 230 or obtained from another network device.

In step 506, the SDN controller 230 sends bandwidth allocation commands 244 to each of the intermediate nodes of the selected path (in this example the path 121). The bandwidth allocation commands 244 are configured to cause the intermediate nodes to reserve the requested bandwidth for the traffic flow. The bandwidth allocation commands 244 include information relating to an amount of bandwidth to be reserved by each node in its link to a succeeding node in the path (nodes 104, 107, and 111, respectively, for the nodes 102, 104, and 107).

In step 508, the SDN controller 230 sends a bandwidth reservation response 246 to the sending node 101, the bandwidth reservation response 246 comprising information identifying the nodes of the selected path, as well as an amount of bandwidth to be reserved by the sending node 101 in its link to node 102, its succeeding node in the selected path, path 121.

Figure 6:
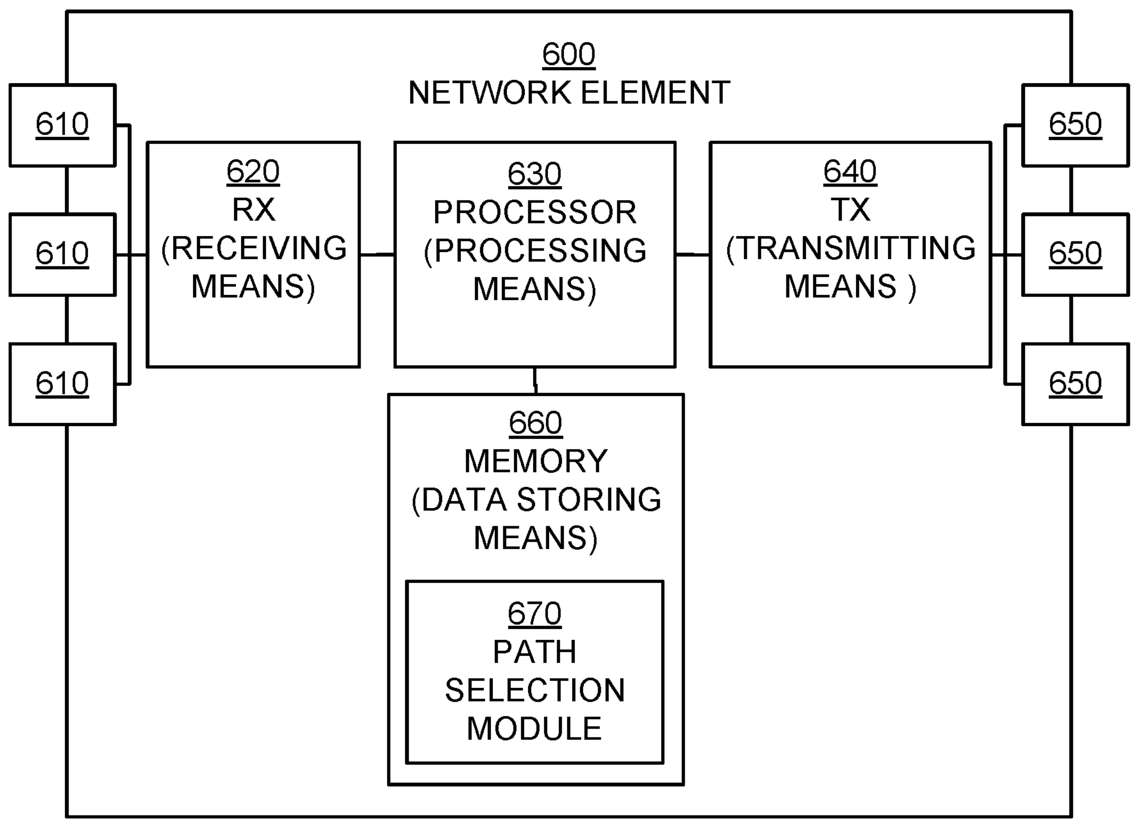
FIG. 6 is a diagram illustrating a network element according to an embodiment of the present disclosure.

FIG. 6 is a diagram illustrating a network element 600 according to an embodiment of the present disclosure. The network element 600 can be any network element such as, but not limited to, any router, switch, or controller used by service providers around the world. The network element 600 is suitable for use as any of nodes 101-111 of the OTNs 100 and 200 or as the SDN controller 230 of the router topology 200. The network element 600 may also be referred to as a network device. The network element 600 includes receiver units (RX) 620 (i.e., receivers) or receiving means for receiving data via ingress ports 610. The network element 600 also includes transmitter units (TX) 640 (i.e., transmitters) or transmitting means for transmitting via data egress ports 650.

The network element 600 includes a memory 660 or data storing means for storing the instructions and various data. The memory 660 can be any type of or combination of memory components capable of storing data and/or instructions. For example, the memory 660 can include volatile and/or non-volatile memory such as read-only memory (ROM), random access memory (RAM), ternary content-addressable memory (TCAM), and/or static random-access memory (SRAM). The memory 660 can also include one or more disks, tape drives, or solid-state drives. In some embodiments, the memory 660 can be used as an over-flow data storage device to store programs when such programs are selected for execution, and to store instructions and data that are read during program execution.

The network element 600 has one or more processor(s) 630 or other processing means (e.g., central processing unit (CPU)) to process instructions. The processor 630 may be implemented as one or more CPU chips, cores (e.g., as a multi-core processor), field-programmable gate arrays (FPGAs), application specific integrated circuits (ASICs), or digital signal processors (DSPs). The processor 630 is communicatively coupled via a system bus with the ingress ports 610, RX 620, TX 640, egress ports 650, and memory 660. The processor 630 can be configured to execute instructions stored in the memory 660. Thus, the processor 630 comprises a device for performing any computation, comparison, determination, initiation, configuration, or any other action corresponding to the claims when the appropriate instruction is executed by the processor. In some embodiments, the memory 660 can be memory that is integrated with the processor 630.

In one embodiment, the memory 660 stores a path selection module 670. The path selection module 670 includes data and executable instructions for implementing the disclosed embodiments. For instance, the path selection module 670 can include instructions for implementing the methods described in FIGS. 3, 4, and 5. The inclusion of the path selection module 670 substantially improves the functionality of the network element 600 by enabling granularity aware routing path selection and end-to-end bandwidth reservation for an Internet traffic flow with an underlying OTN. A network element 600 including a path selection module 670 implementing a first of the disclosed methods for routing path selection and bandwidth reservation is a different system than a network element 600 including a path selection module 670 implementing a second of the disclosed processes for routing path selection and bandwidth reservation.

Figure 7:
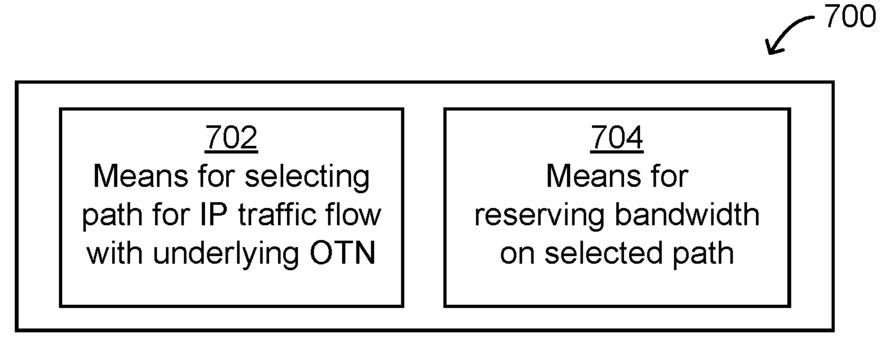
FIG. 7 illustrates an apparatus configured to implement one or more of the methods described herein for routing path selection and bandwidth reservation.

FIG. 7 illustrates an apparatus 700 configured to implement one or more of the methods for routing path selection and bandwidth reservation as described herein. For example, the apparatus 700 is configured to implement the methods 300, 400, and 500 of FIGS. 3, 4, and 5, respectively. The apparatus 700 may be implemented in the network device 600. The apparatus 700 comprises means 702 for selecting a path for Internet traffic flow with an underlying OTN, as described with reference to the method 300; and means 704 for reserving bandwidth on the selected path, as described with reference to the methods 400 and 500.

Figures 8, 9:
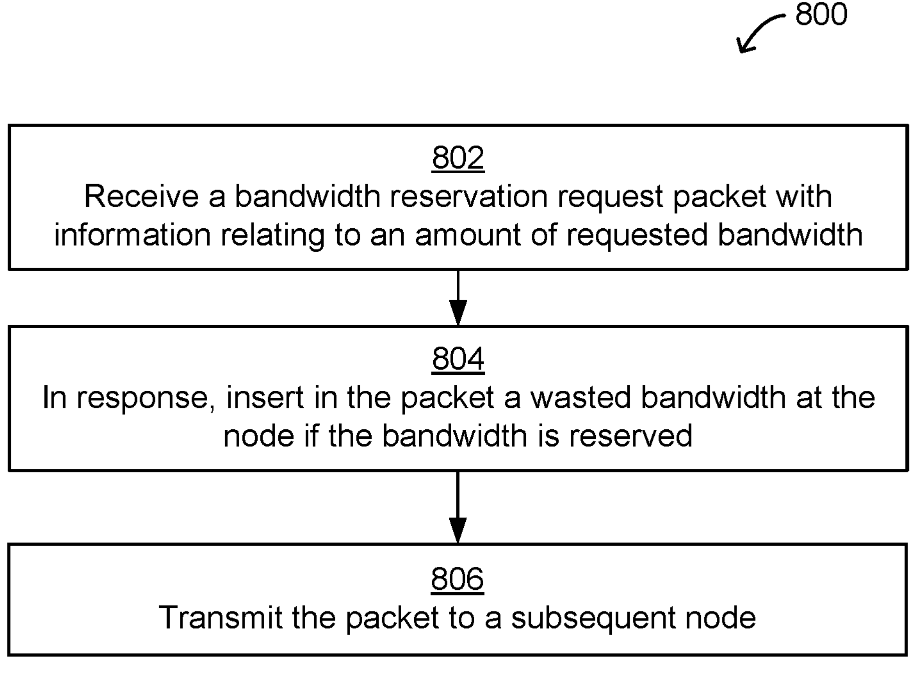
FIG. 8 illustrates a method according to an embodiment of the present disclosure for processing a bandwidth reservation request packet in an intermediate node.
FIG. 9 illustrates a method according to an embodiment of the present disclosure for initiating routing path selection and bandwidth reservation in a sending node.

FIG. 8 illustrates a method 800 according to an embodiment of the present disclosure for processing a bandwidth reservation request packet in an intermediate node. Intermediate node 102 of FIG. 1 is a node with an Optical Transport Network (OTN) as an underlying network. In step 802, the intermediate node 102 receives a bandwidth reservation request packet that includes information relating to an amount of requested bandwidth for an Internet traffic flow through the OTN. In response to receiving the bandwidth reservation request packet, in step 804 the intermediate node 102 inserts into the bandwidth reservation request packet an indication of a wasted bandwidth at the intermediate node 102 if the requested bandwidth is reserved. Finally, in step 806 the intermediate node 102 transmits the bandwidth reservation request packet with the inserted indication of a wasted bandwidth to a subsequent node (for example, intermediate nodes 104 and/or 105).

FIG. 9 illustrates a method 900 according to an embodiment of the present disclosure for initiating routing path selection and bandwidth reservation in a sending node. Nodes 101-111 of FIG. 1 are nodes with an Optical Transport Network (OTN) as an underlying network. In step 902, the sending node 101 sends a bandwidth reservation request packet to the receiving node 111. The bandwidth reservation request packet comprises information relating to an amount of requested bandwidth for an Internet traffic flow with the OTN. The bandwidth reservation request packet is configured to cause intermediate nodes such as nodes 102-110 to insert into the bandwidth reservation request packet an indication of an amount of wasted bandwidth at the intermediate node if the bandwidth is reserved. The bandwidth reservation request packet is further configured to cause the receiving node 111 to perform the path selection method 300 of FIG. 3.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A path selection method for selecting a path for an Internet traffic flow with an underlying Optical Transport Network (OTN) in a network element, the method comprising:

obtaining, by the network element, a plurality of predefined paths for the Internet traffic flow through the OTN, wherein each predefined path of the plurality of predefined paths comprises a specified plurality of hops between nodes of the OTN;

determining, by the network element, an unused bandwidth for the each predefined path of the plurality of predefined paths based on an amount of requested bandwidth for the Internet traffic flow and determining an unused bandwidth of each hop of the specified plurality of hops of the predefined path; and selecting, by the network element, either no predefined path or one predefined path of the plurality of predefined paths, the selection based on a selection criterion value determined for the each predefined path of the plurality of predefined paths, the selection criterion value based on the unused bandwidth for the predefined path.

2. The path selection method of claim 1, wherein:

each selection criterion value for the each predefined path of the plurality of predefined paths is determined based on a total unused bandwidth for the predefined path over all hops of the plurality of hops of the predefined path; and selecting the predefined path comprises selecting the predefined path having a minimum selection criterion value.

3. The path selection method of claim 1, wherein:

each selection criterion value for the each predefined path of the plurality of predefined paths is determined based on a minimum unused bandwidth among all hops of the predefined path; and selecting the predefined path comprises selecting the predefined path having a maximum selection criterion value.

4. The path selection method of claim 1, wherein each selection criterion value for the each predefined path of the plurality of predefined paths is determined based on the unused bandwidth of each hop of the predefined path.

5. The path selection method of claim 4, wherein:

each selection criterion value for the each predefined path of the plurality of predefined paths is determined based on (i) a total unused bandwidth for the predefined path and (ii) a minimum unused bandwidth among all the hops of the predefined path; and selecting the predefined path comprises selecting the predefined path having a maximum selection criterion value.

6. The path selection method of claim 4, wherein:

each selection criterion value for the each predefined path of the plurality of predefined paths is determined based on a variance of the unused bandwidth of the hops of the predefined path; and selecting the predefined path comprises selecting the predefined path having a minimum selection criterion value.

7. The path selection method of claim 4, wherein selecting the predefined path comprises randomly selecting one of a subset of predefined paths, where the each predefined path of the subset of predefined paths has an equal value of the selection criterion.

8. A method for routing path selection and bandwidth reservation in a node with an Optical Transport Network (OTN) as an underlying network, the method comprising:

receiving, by the node, a plurality of bandwidth reservation request packets originating from a sending node of the OTN over a corresponding plurality of paths, each bandwidth reservation request packet comprising information relating to a selection criterion and an amount of requested bandwidth for an Internet traffic flow;

determining, by the node, an unused bandwidth for each path of the plurality of paths, based on the amount of requested bandwidth for the Internet traffic flow; and selecting, by the node, either no path or one path of the plurality of paths, the selection based on a selection criterion value determined for the each path of the plurality of paths, the selection criterion value based on the unused bandwidth for the path; and sending, by the node, a plurality of bandwidth reservation response packets to the sending node, each bandwidth reservation response packet of the plurality of bandwidth reservation response packets sent over a different path of the plurality of paths;

wherein each bandwidth reservation response packet of the plurality of bandwidth reservation response packets comprises information indicating whether the path over which it is sent was selected, and wherein a bandwidth reservation response packet sent over a selected path is configured to cause nodes on the selected path to reserve bandwidth for the Internet traffic flow.

9. The method of claim 8, wherein:

each selection criterion value for the each path of the plurality of paths is determined based on a total unused bandwidth for the path; and selecting the path comprises selecting the path having a minimum selection criterion value.

10. The method of claim 8, wherein:

each selection criterion value for the each path of the plurality of paths is determined based on a minimum unused bandwidth among all hops of the path; and selecting the path comprises selecting the path having a maximum selection criterion value.

11. The method of claim 8, wherein each selection criterion value for the each path of the plurality of paths is determined based on the unused bandwidth of each hop of the path.

12. The method of claim 8, wherein at least one bandwidth reservation request packet of the plurality of bandwidth reservation request packets includes information relating to the unused bandwidth for the path over which it is sent.

13. The method of claim 8, wherein at least one bandwidth reservation request packet of the plurality of bandwidth reservation request packets includes information relating to the unused bandwidth on each hop of the path over which it is sent.

14. The method of claim 8, wherein the node selects one path of the plurality of paths.

15. A method for routing path selection and bandwidth reservation in a Software Defined Network (SDN) controller, the method comprising:

receiving, by the SDN controller, a bandwidth reservation request sent by a sending node with an Optical Transport Network (OTN) as an underlying network, the bandwidth reservation request comprising information relating to an amount of requested bandwidth for an Internet traffic flow with the OTN, and an identity of a receiving node with the OTN as the underlying network;

obtaining, by the SDN controller, a plurality of paths for the Internet traffic flow through the OTN, wherein each path of the plurality of paths comprises a specified plurality of hops between nodes of the OTN;

determining, by the SDN controller, an unused bandwidth for the each path of the plurality of paths based on the amount of requested bandwidth for the Internet traffic flow and an unused bandwidth of each hop of the specified plurality of hops of the path;

selecting, by the SDN controller, either no path or one path of the plurality of paths, the selection based on a selection criterion value determined for the each path of the plurality of paths, the selection criterion value based on the unused bandwidth for the path;

sending, by the SDN controller, bandwidth allocation commands to nodes of the selected path, if any, the bandwidth allocation commands configured to cause the nodes to reserve the requested bandwidth for the Internet traffic flow; and sending, by the SDN controller, a bandwidth reservation response to the sending node, the bandwidth reservation response comprising information identifying the selected path, if any, wherein the bandwidth reservation response is configured to instruct the sending node to include information identifying the selected path, if any, in packets of the Internet traffic flow.

16. The method of claim 15, wherein:

each selection criterion value for the each path of the plurality of paths is determined based on a total unused bandwidth for the path; and selecting the path comprises selecting the path having a minimum selection criterion value.

17. The method of claim 15, wherein each selection criterion value for the each path of the plurality of paths is determined based on the unused bandwidth of each hop of the path.

18. The method of claim 15, wherein:

each selection criterion value for the each path of the plurality of paths is determined based on a minimum unused bandwidth among all hops of the path; and selecting the path comprises selecting the path having a maximum selection criterion value.

19. The method of claim 15, wherein the bandwidth reservation request further includes information relating to the selection criterion.

* * * * *